United States Patent
Cardona et al.

(10) Patent No.: US 8,537,706 B2
(45) Date of Patent: Sep. 17, 2013

(54) PRESERVING TRAFFIC CLASS PRIORITY QOS WITH SELF-VIRTUALIZING INPUT/OUTPUT DEVICE

(75) Inventors: Omar Cardona, Austin, TX (US); James B. Cunningham, Austin, TX (US); Daniel G. Eisenhauer, Austin, TX (US); Charles S. Graham, Rochester, MN (US); Jeffrey J. Lynch, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 13/004,116

(22) Filed: Jan. 11, 2011

(65) Prior Publication Data

US 2012/0180047 A1    Jul. 12, 2012

(51) Int. Cl.
*H04L 12/26* (2006.01)

(52) U.S. Cl.
USPC ........................................ 370/252; 370/395.53

(58) Field of Classification Search
None
See application file for complete search history.

(56) References Cited

U.S. PATENT DOCUMENTS

| | | | |
|---|---|---|---|
| 7,787,480 B1 * | 8/2010 | Mehta et al. | 370/401 |
| 7,983,255 B2 * | 7/2011 | Kue | 370/389 |
| 8,208,396 B2 * | 6/2012 | Eisenhauer et al. | 370/252 |
| 8,422,500 B2 * | 4/2013 | Rabie et al. | 370/392 |
| 2007/0053353 A1 * | 3/2007 | Lee et al. | 370/389 |
| 2007/0220246 A1 * | 9/2007 | Powell et al. | 713/2 |
| 2009/0037941 A1 | 2/2009 | Armstrong et al. | |
| 2009/0248937 A1 | 10/2009 | Solomon et al. | |
| 2009/0276773 A1 | 11/2009 | Brown et al. | |
| 2009/0313391 A1 | 12/2009 | Watanabe et al. | |
| 2010/0014526 A1 | 1/2010 | Chavan et al. | |
| 2010/0082874 A1 | 4/2010 | Baba et al. | |
| 2010/0095310 A1 | 4/2010 | Oshins | |
| 2010/0180274 A1 | 7/2010 | Cherian et al. | |
| 2010/0226381 A1 * | 9/2010 | Mehta et al. | 370/401 |
| 2011/0299414 A1 * | 12/2011 | Yu et al. | 370/252 |
| 2011/0299424 A1 * | 12/2011 | Rikitake et al. | 370/254 |
| 2012/0188870 A1 * | 7/2012 | Eisenhauer et al. | 370/230 |
| 2012/0300785 A1 * | 11/2012 | Liu | 370/395.53 |

* cited by examiner

*Primary Examiner* — Michael J Moore, Jr.
(74) *Attorney, Agent, or Firm* — Wood, Herron & Evans, LLP

(57) ABSTRACT

Frame wrapping such as Q-in-Q frame wrapping is used to enforce QoS prioritization with a converged or multi-function self-virtualizing IO resource such as a converged SRIOV network adapter. Frame wrapping may be used to avoid conflicting priorities from frames associated with virtual functions for which ACLs are not enforced, and thereby preserve QoS prioritization for lossless traffic classes.

24 Claims, 7 Drawing Sheets

PRESERVING TRAFFIC CLASS PRIORITY QOS WITH SELF-VIRTUALIZING INPUT/OUTPUT DEVICE

FIELD OF THE INVENTION

The invention is generally related to data processing, and in particular to logically partitioned data processing systems and self-virtualizing input/output devices for use with same.

BACKGROUND OF THE INVENTION

Modern requirements for a computer system may require that a computer be utilized to run several operating environments, or operating systems, at once. In a typical embodiment, a single logically partitioned computer or data processing system can run a plurality of operating systems in a corresponding plurality of logical partitions (LPARs), also referred to as virtual machines (VMs). Each operating system resides in its own LPAR, with each LPAR allocated a part of a physical processor, an entire physical processor, or multiple physical processors from the computer. Additionally, a portion of the computer's memory is allocated to each LPAR. An underlying partition manager, often referred to as a hypervisor or virtual machine monitor (VMM), manages and controls the LPARs. The hypervisor is typically a part of the system firmware and manages the allocation of resources to the operating systems and LPARs. As such, one logically partitioned computer may run one or more LPARs and thus virtualize the operations of the applications, operating systems, and other program code configured to operate in those logical partitions.

In addition to sharing the physical processors and memory in a logically partitioned computer, LPARs also typically share other types of physical hardware resources, which are collectively referred to herein as input/output (IO) resources. For example, in order to provide LPARs with access to external networks, logically partitioned computers typically include multiple physical network adapters, e.g., network interface cards (NICs), that are shared by the LPARs, such that each LPAR is allocated at least a part of one or more physical network adapters to enable that LPAR to access various networks, e.g., local area networks, wide area networks, storage networks, the Internet, etc. Many IO resources, including many network adapters, are compliant with various Peripheral Component Interconnect (PCI) standards. PCI-compliant IO resources typically implement one or more PCI functions, e.g., to support different protocols such as Ethernet, Fibre Channel over Ethernet (FCoE), etc.

Access to IO resources in both logically partitioned and non-partitioned computers is typically handled at the operating system level through the use of device drivers. Device drivers typically provide a common interface to the operating system and the applications executing thereon to effectively hide the implementation details of a particular hardware device from these higher software layers. High level commands from these higher software layers are typically translated to device-specific commands that are appropriate for the particular make and model of the underlying IO resource. Therefore, so long as different device drivers from different vendors of a particular type of IO resource provide the same common interface to the operating system and applications, the operating system and applications can access the IO resource using the same commands and without concern for the particular make and model of the IO resource.

In many conventional logically partitioned computers, IO resources are virtualized within the hypervisor, so that conventional device drivers, appropriate for use in both logically partitioned and non-partitioned computers, may be used. Virtualization of an IO resource in a hypervisor typically requires that the hypervisor trap device accesses by the device drivers in the LPARs and effectively route the operations to the appropriate physical IO resources. Thus, where multiple LPARs share a common physical IO resource, the hypervisor itself handles the multiplexing of operations performed by the physical IO resource on behalf of each LPAR. Allocating such higher-level functionality to a hypervisor, however, has been found to introduce excessive complexity and processing overhead to the hypervisor. It is desirable in many implementations for a hypervisor to be as small, compact, fast and secure as possible so that the processing overhead of the hypervisor is minimized. As such, other technologies have been introduced in an attempt to off-load the responsibility of virtualizing IO resources from the hypervisor.

For example, in some designs, a dedicated LPAR, referred to as a virtual input/output server (VIOS), may be used to manage the virtualization of IO resources. While the use of a VIOS offloads higher-level functions from the hypervisor and reduces the overall complexity of the hypervisor, it has been found that using LPARs to provide such services to other LPARs requires relatively high overhead to instantiate and run the LPAR, and thus, a full operating system, in order to provide such services.

More recently, some designs have relied upon adjunct partitions (APs), which have also been referred to as partition adjuncts, to assist with the virtualization of IO resources. An AP is a type of partition that is more limited than a full, logical partition. An AP typically runs in a flat, static effective address space and problem state, which permits the hypervisor to apply a range of hypervisor and processor optimizations that result in a substantial decrease in system overhead associated with a context switch of the state machine from an LPAR to state data of an AP, that is, compared to a context switch of the state machine between two LPARs. In other respects, an AP is similar to a full LPAR. For example, an AP typically can be assigned resources, either physical or virtual, similar to a full LPAR. Further, an AP can be an end-point of a virtual input output (VIO) communications mechanism, similar to a full LPAR, such as VIOS.

In addition, some designs have incorporated the concept of self-virtualization of IO resources, where at least a portion of the virtualization of a physical IO resource is handled within the resource itself. The PCI single root input/output virtualization (SRIOV) specification, for example, enables a physical IO resource such as a NIC to incorporate replicated on-board functionality such as memory spaces, work queues, interrupts, and command processing so that a single function such as a single Ethernet connection can be presented to a logically partitioned computer as multiple and separate physical functions. The SRIOV specification introduces the concepts of physical functions (PFs) and virtual functions (VFs), with the former representing full PCI functions and having the ability to instantiate, configure and manage VFs, and the latter representing lightweight PCI functions with reduced configuration resources and usable by LPARs to access a self-virtualizing device.

It has been found that the use of APs in conjunction with self-virtualizing IO resources provides a flexible, efficient framework with which to virtualize IO resources in a logically partitioned computer, and does so without requiring a separate full LPAR to provide the virtualization, and without requiring such functionality to be embedded within client LPARs or in the hypervisor.

Some inefficiencies nonetheless exist in logically-partitioned computers that utilize APs to manage self-virtualizing IO resources. For example, converged enhanced Ethernet (which may be referred to as "CE" or "CEE") protocols allow for running multiple classes of traffic, e.g., Fibre Channel, inter-process communication (IPC), management and local area network (LAN) traffic, among others, over a single adapter/single Ethernet fabric, bringing tremendous cost benefits to data centers via fabric convergence. Each traffic class may have shared or non-shared priority characteristics that are negotiated via a Data Center Bridging Capability Exchange (DCBX) between the adapter and a switch.

The DCBX exchange protocol allows for the negotiation of traffic priorities, which normally classifies Fibre Channel as lossless traffic and LAN as lossy traffic. The priorities may be used to establish membership to a priority class, and a priority field in a virtual local area network (VLAN) header of an Ethernet frame may be used by an adapter to execute quality of service (QoS) prioritization of traffic. Adapters using both Fibre Channel and LAN over the same physical port are referred to as converged adapters.

With converged adapters, concerns may exist that a LAN device driver in an operating system may allow for the placement of Ethernet frames on the network fabric with priorities that conflict with the pre-negotiated priorities used for QoS prioritization. An Ethernet interface exposed to an operating system often allows an administrator to create VLANs and any priority within a VLAN device, and in some circumstances, the selected priorities may conflict with the QoS prioritization used for Fibre Channel and other lossless protocols.

On non-self-virtualizing converged adapters, the solution to this problem may be somewhat trivial because operating system device drivers typically can view both Fibre Channel and LAN functions to resolve any priority conflicts. Thus, a LAN driver can typically query Fibre Channel priorities and inspect egress LAN frames for invalid priorities. On detection of an invalid or conflicting priority for a LAN frame, the frame may be dropped and the appropriate statistic is incremented. On the other hand, there is a performance overhead incurred in having an operating system driver perform frame parsing and drop frames in software.

In a self-virtualizing converged adapter, however, adapter functions are presented to operating systems in much the same manner as standalone adapters. Thus, for example, a converged SRIOV network adapter in a logically partitioned data processing system will present virtual functions to the operating systems in the LPARs to emulate separate adapter functions on standalone adapters. As such, a LAN virtual function, and thus an associated LAN driver in one LPAR may not be aware of other virtual functions for other traffic classes in other LPARs, so the LAN driver cannot query for the priorities of the traffic in other virtual functions.

In some instances, access control lists (ACLs) may be exploited on the virtual functions to restrict their respective usable priorities. Thus, if an LPAR attempts to transmit a frame with a priority that conflicts with a lossless priority assigned to virtual function, then the frame may be dropped by the adapter on egress ACL checking.

However in instances where a virtual function has no ACLs enforced, the virtual function may become a security exposure because it can place frames with conflicting priorities on the network fabric. Since there is no method to enforce the priority, therefore, Fibre Channel or other lossless traffic may be adversely impacted.

Therefore, a need continues to exist in the art for a manner of efficiently enforcing QoS prioritization with a converged or multi-function self-virtualizing IO resource.

SUMMARY OF THE INVENTION

The invention addresses these and other problems associated with the prior art by utilizing frame wrapping to enforce QoS prioritization with a converged or multi-function self-virtualizing IO resource. In particular, frame wrapping may be used in embodiments consistent with the invention to avoid conflicting priorities from frames associated with virtual functions for which ACLs are not enforced, and thereby preserve QoS prioritization for lossless traffic classes.

Therefore, consistent with one aspect of the invention, traffic class priority QoS is preserved in a multi-function self-virtualizing IO resource. The multi-function self-virtualizing IO resource communicates data associated with first and second virtual functions, where the first and second virtual functions are respectively associated with first and second traffic classes, and where the first traffic class supports QoS prioritization. The multi-function self-virtualizing IO resource also detects a conflicting priority for a frame associated with the second virtual function prior to transmission of the frame over a network to which the multi-function self-virtualizing IO resource is coupled, and in response to detecting the conflicting priority, wraps the frame with an additional tag having a non-conflicting priority prior to transmitting the frame over the network.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
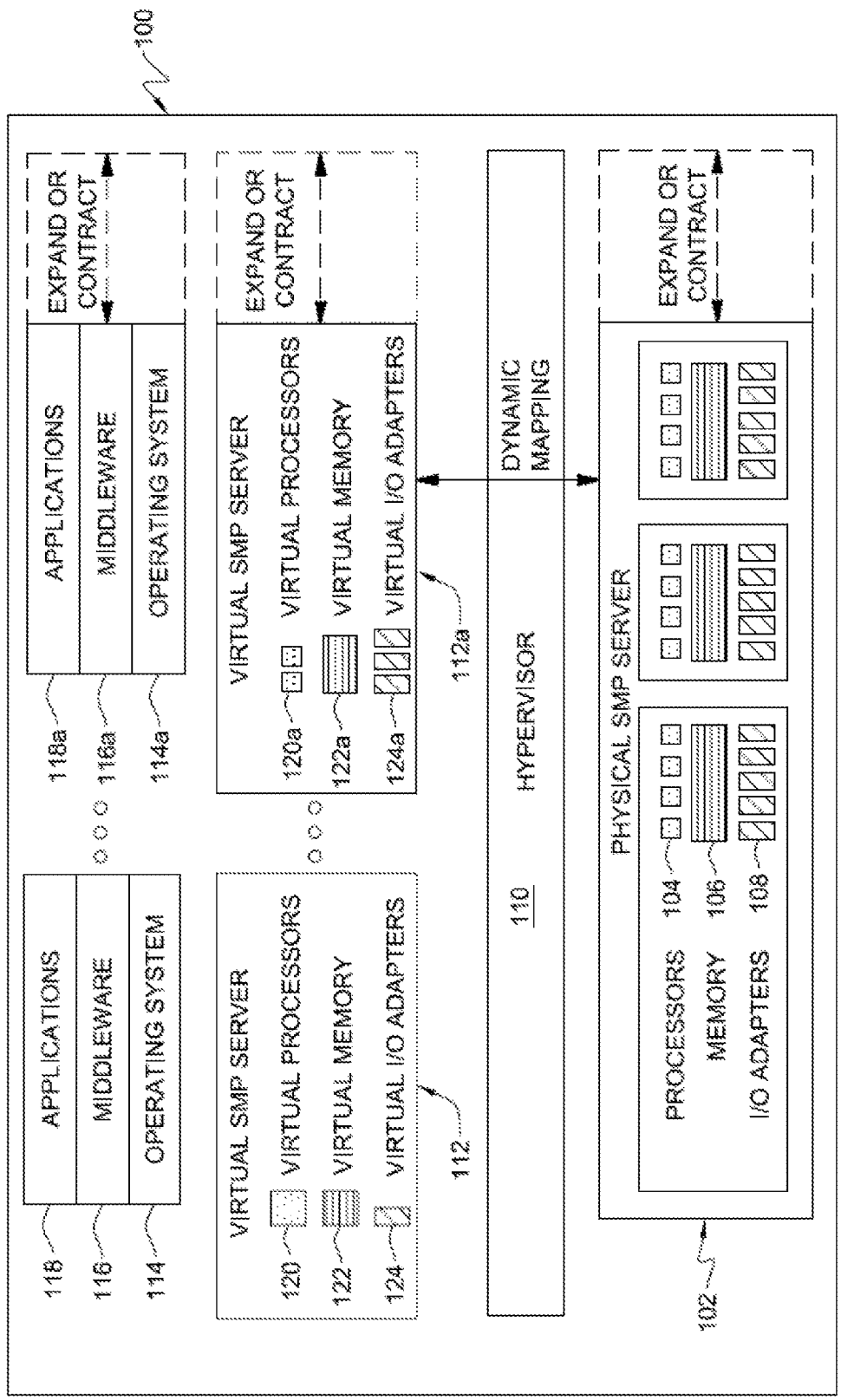
FIG. 1 is a block diagram of one embodiment of a data processing system configured to implement one or more aspects of the present invention.

Embodiments consistent with the invention selectively utilize frame wrapping to enforce QoS prioritization with a converged or multi-function self-virtualizing IO resource such as a converged SRIOV network adapter, e.g., to avoid conflicting priorities from frames associated with virtual functions for which ACLs are not enforced, thereby preserving QoS prioritization for lossless traffic classes.

In particular, traffic class priority QoS is preserved in a multi-function self-virtualizing IO resource that communicates data associated with first and second virtual functions that are respectively associated with first and second traffic classes, where at least the first traffic class supports QoS prioritization. QoS prioritization, in this regard, typically refers to a traffic class-based priority scheme that ensures desired bandwidth and communication performance for one or more classes, or types, of communications traffic. Traffic classes that typically support QoS prioritization include various types of lossless traffic such as Fibre Channel. Traffic classes that typically don't support QoS prioritization include various types of lossy traffic such as LAN/Ethernet. However, it will be appreciated that conflicting priorities may nonetheless occur in connection with lossless traffic classes (e.g., a LAN RDMA virtual function with lossless traffic selected may conflict with a LAN lossy virtual function just as a result of running UDP/TCP traffic), so the invention is not limited to specific traffic classes or protocols. Rather, the invention may apply in a multitude of cases where a risk exists that multiple virtual functions (e.g., a virtual function that does not enforce ACLs and one that does) may attempt to transmit frames with conflicting priorities.

A multi-function self-virtualizing IO resource consistent with the invention may include, for example, an SRIOV device, e.g., an SRIOV network adapter. In addition, a multi-function self-virtualizing IO resource consistent with the invention may also be a converged device, whereby multiple functions associated with multiple different traffic classes may be supported, including both classes that support QoS prioritization, as well as classes that do not support QoS prioritization. Alternatively, a multi-function self-virtualizing IO resource may be implemented as a Multi-Root IO Virtualization (MRIOV) device, or as another type of adapter or interconnect that supports hardware-based IO virtualization.

In embodiments consistent with the invention, a multi-function self-virtualizing IO resource detects a conflicting priority for a frame associated with a virtual function prior to transmission of the frame over a network to which the multi-function self-virtualizing IO resource is coupled, and in response to detecting the conflicting priority, wraps the frame with an additional tag having a non-conflicting priority prior to transmitting the frame over the network. Typically, the frame is associated with a lossy traffic class that does not support QoS prioritization, so that wrapping the frame with an additional tag having a non-conflicting priority ensures that the conflicting priority will not adversely affect QoS prioritization for other traffic classes from other functions. Frame wrapping consistent with the invention, for example, may include Q-in-Q frame wrapping, where the additional tag takes the form of a VLAN tag, e.g., as supported by the 802.1QinQ protocol.

Embodiments consistent with the invention are also implemented within a multi-function self-virtualizing IO resource, e.g., within control logic resident in the resource. In one embodiment, for example, the control logic may be implemented using firmware-type or embedded program code executing on one or more hardware-based processors or controllers resident in the resource.

It will be appreciated that other modifications and variations to the herein-described embodiments may be made consistent with the invention. Therefore, the invention is not limited to the particular implementations disclosed herein.

Hardware and Software Environment

Now turning to the Drawings, wherein like numbers denote like parts throughout the several views, FIG. 1 is a block diagram of a data processing system or computer 100, which in one example, is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processors 104, memory 106, and I/O adapters 108. These physical devices are managed by hypervisor 110, which may also be referred to as a partition manager, virtual machine monitor or PHYP. Processors 104 are shared processors and each may be a simultaneous multi-threading (SMT)-capable processor that is capable of concurrently executing multiple different threads on the processor.

A virtual server, or logical partition, is a proxy for a physical server that has the same capabilities, interfaces, and state. Virtual servers 112 are created and managed by a hypervisor 110 that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes virtual processors 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the virtual servers or logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
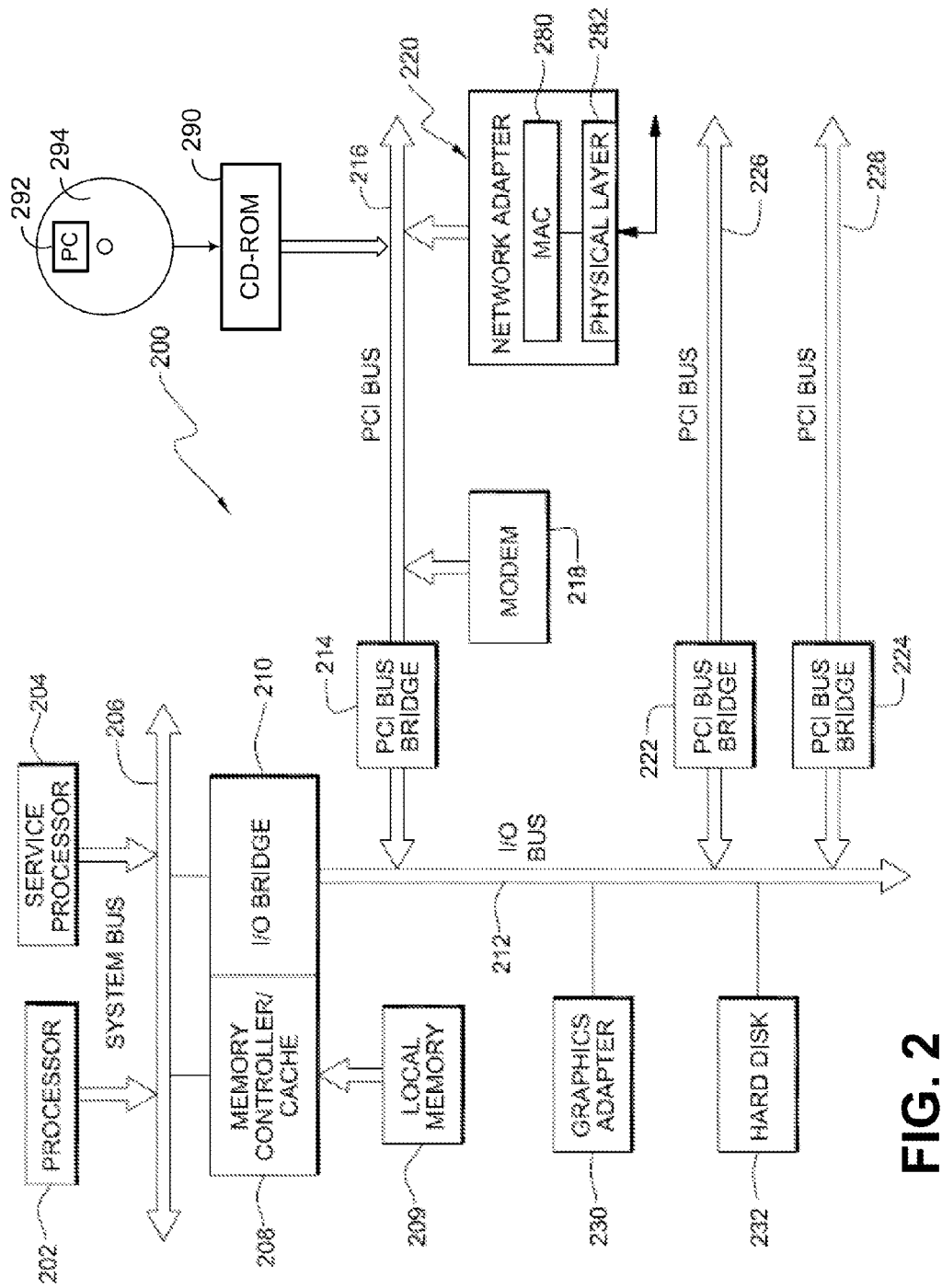
FIG. 2 is a more detailed illustration of a data processing system that may be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, the data processing system implementing an adjunct partition such as described hereinbelow can be built upon technologies found in IBM's p/i Series product line firmware and systemware, such as described in Version 2.2 of the "Power Architecture Platform Reference" (PAPR) material at Power.org.

One or more aspects of the present invention can also be included in an article of manufacture (e.g., one or more computer program products) having, for instance, computer readable media. The media has therein, for instance, computer readable program code or logic (e.g., instructions, code, commands, etc.) to provide and facilitate the capabilities of the present invention. The article of manufacture can be included as a part of a computer system or sold separately. One example of an article of manufacture or a computer program product is illustrated in FIG. 2 and incorporates computer readable program code 292 stored on a computer readable medium such as an optical disk 294, and readable by an optical drive 290 coupled to data processing system 200. Additional examples of computer readable media include various physical and/or non-transitory media such as a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-RAN) and DVD.

A sequence of program instructions or a logical assembly of one or more interrelated modules defined by computer readable program code or logic direct the performance of one or more aspects of the present invention.

Although various embodiments are described herein, these are only examples. Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction;

an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one hardware-implemented processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output (I/O) devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

In addition, various program code described herein may be identified based upon the application or software component within which it is implemented in specific embodiments of the invention. However, it should be appreciated that any particular program nomenclature used herein is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Adjunct Partitions

Embodiments consistent with the invention utilize adjunct partitions, or partition adjuncts, which are partitions that are more limited than full, logical partitions. As described below, the adjunct partition runs in a flat, static effective address space and problem state. These restrictions permit the hypervisor to apply a range of hypervisor and processor optimizations that result in a substantial decrease in system overhead associated with a context switch of the state machine from a logical partition to state data of an adjunct partition, that is, compared to a context switch of the state machine between logical partitions. In other respects, an adjunct partition is similar to a full logical partition. For example, an adjunct partition can be assigned resources, either physical or virtual, similar to a full logical partition. Further, an adjunct partition can be an end-point of a virtual input output (VIO) communications mechanism, similar to a full logical partition, such as a virtual input output server (VIOS).

Figure 3:
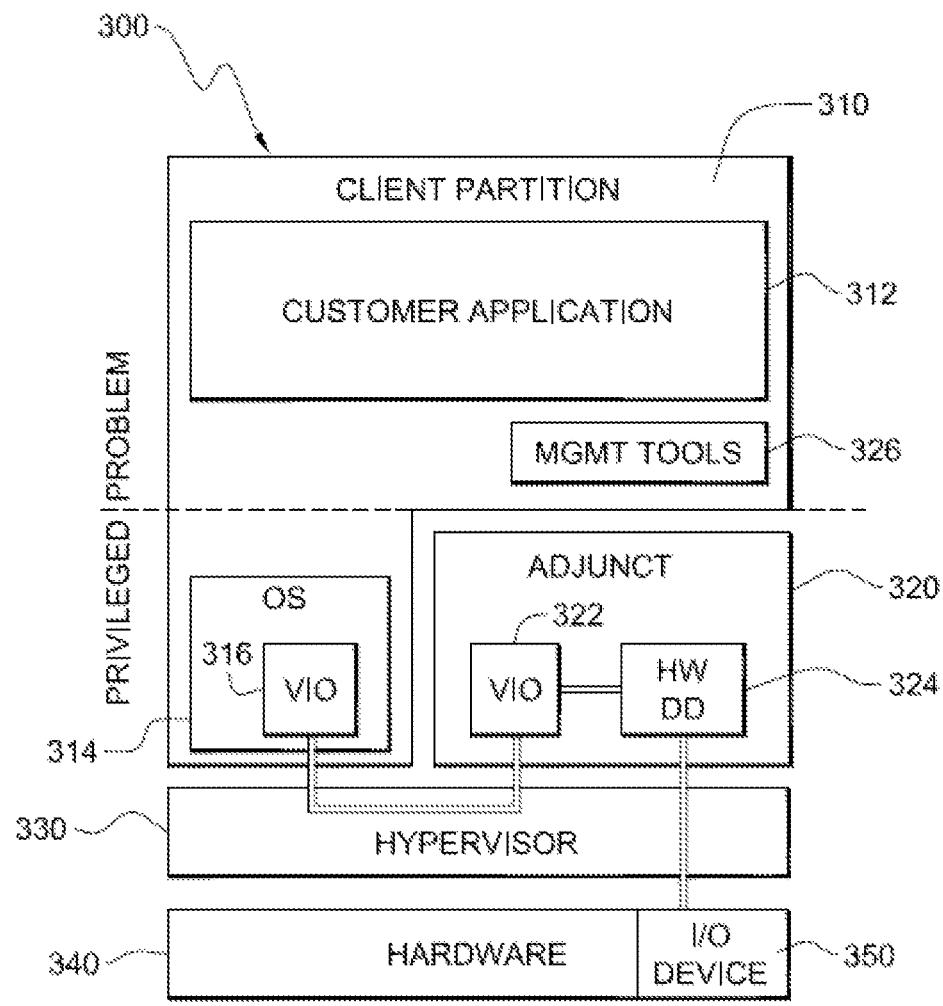
FIG. 3 illustrates one embodiment of a data processing system comprising a client logical partition and an adjunct partition, in accordance with an aspect of the present invention.

FIG. 3 illustrates one example of a data processing system 300, comprising a client logical partition (or simply client partition) 310 and an adjunct partition 320, in accordance with an aspect of the present invention. Client partition 310 is a logical partition which comprises one or more customer applications 312, an operating system instance 314 and a virtual I/O facility 316. Client partition 310 runs atop a hypervisor 330, and provides higher-level function than that provided by the hypervisor itself. Hypervisor 330 executes atop the underlying system hardware 340, which is shown to include one or more I/O devices 350.

Adjunct partition 320 is conceptually a child partition to client partition 310. The adjunct partition is less than a full logical partition, but is run in a manner whereby the hypervisor enforces security and isolation between the adjunct partition and the client partition it runs within. The adjunct partition is provided with reduced functionality compared with a full logical partition, for example, has no access to memory management unit (MMU) configuration or floating-point facilities, and is an environment that only the functionality needed to run the desired service (e.g., I/O driver) is provided. In the illustrated example, adjunct partition 320 includes a virtual I/O interface 322 and a hardware device driver service 324, which allows access to I/O device 350. In operation, client partition 310 accesses I/O device 350 via the adjunct partition 320, as illustrated. By reducing functionality within the adjunct partition environment, the run time overhead of dispatching and maintaining the adjunct partition (compared with another full logical partition) is reduced, and consequently, many of the performance disadvantages of using a separate logical partition as a virtual input output server (VIOS) are avoided.

As a specific example, the adjunct partition is described herein as running a reduced operating system environment for a device driver service. This service is provided by way of example only. The adjunct partition provides minimal, optimized, infrastructure comprising only (in one example) the structure needed by a device driver. For instance, if a Linux device driver is to run inside of the adjunct partition, then the minimal execution environment includes only the Linux kernel services or equivalent services, that the Linux device driver requires. If an AIX device driver is to run inside of the adjunct partition, then the minimal execution environment includes only the AIX kernel services, or equivalent services, that the AIX device driver requires. Advantageously, the adjunct partition runs in hypervisor/problem-state, directly against hypervisor interfaces. As explained in detail below, dispatching of the adjunct partition does not require a full partition context switch, which simplifies adjunct kernel requirements. This is achieved, in part, by mapping the adjunct partition into the client partition's virtual address page table. Client partition to adjunct partition isolation can be achieved, for example, via hypervisor-managed memory keys. Advantageously, the adjunct partition is not customer viewable. Further, the same adjunct partition service (referred to herein as a global adjunct partition service) may be instantiated within multiple client partitions, as explained below.

Various adjunct partition usage models can be implemented in accordance with the concepts disclosed herein for addressing a number of operating system and platform issues. One example is a local adjunct partition, which conceptually partially resides within an initiating client partition for accessing dedicated resources through a hypervisor. For example, a common adapter/driver service may be provided by adjunct partition for a respective dedicated adapter (i.e., resource).

As another alternative, a global adjunct partition may be used, wherein a service logical partition such as a virtual input output server partition donates memory and physical resources for instantiation of the adjunct partition. Such a global adjunct partition may be accessible or attachable by multiple client partitions, and may provide, for example, input output services to a resource via a hypervisor. As a specific example, the global adjunct partition may comprise a common adapter driver service, and the resource a shared adapter. Yet another embodiment of a global adjunct partition may rely on a hypervisor to provide resources for the adjunct. In this implementation, the hypervisor employs the adjunct partition for its own use, for example, for protection or isolation services that would otherwise exist in the hypervisor's execution domain.

In the illustrated embodiments, in order for an adjunct partition to be a runable program, the hypervisor, along with a client partition that is to use the adjunct partition service, negotiate to establish the adjunct partition environment. Once this negotiation is complete, the client partition will have donated a portion of its virtual address space to the hypervisor for use by the adjunct partition. The hypervisor will use hardware and hypervisor facilities to ensure that the client partition no longer has access to or can modify the donated resources (e.g., the donated virtual address space). The hypervisor instantiates the effective address mappings required to run the adjunct partition using the donated virtual address resources. Subsequently, the hypervisor may switch between dispatching the client partition or the adjunct partition by reprogramming its control of the donated virtual address space. When the client partition runs, it may access all virtual address space assigned to it, except for the donated virtual address range, and when the adjunct partition runs, the hypervisor disables access to all virtual addresses of the client partition, except for the donated virtual address range, that is, the virtual address space to which it is enabled. This toggling of active/inactive virtual address ranges is significantly faster than reprogramming the full memory management and address translation hardware to effect a complete context switch of the current state machine between two full logical partitions, as is necessary to switch, for example, to a virtual input/output server partition. In this manner, the adjunct partition address space is carved out of and separated from the memory management and address translation hardware resources of the client partition. The adjunct partition is thus, from a processor's perspective, part of the client partition, but from the client partition's and hypervisor's perspective, is a distinct entity.

Advantageously, the adjunct partition concepts presented herein reduce the need to use full logical partitions for providing services to client partitions. This in turn frees up resources and improves performance for customer workloads. Additionally, the adjunct partition disclosed herein encourages the development and deployment of virtual platform services in lieu of development of operating system specific services by reducing the performance penalties associated with virtualized services. This in turn allows for savings and cost development, since services may be implemented only once (i.e., in an adjunct partition), rather than natively among multiple operating systems.

Additional details regarding adjunct partitions, their configuration and use, and the various modifications that may be implemented in adjunct partitions consistent with the invention, may be found, for example, in U.S. patent application Ser. No. 12/111,020 filed Apr. 28, 2008 by Armstrong et al. (now published as U.S. P.G. Pub. No. 2009/0037941), which claims priority to U.S. Provisional Application Ser. No. 60/953,512, filed Aug. 2, 2007, each of which is incorporated by reference herein in its entirety.

Figure 4A:
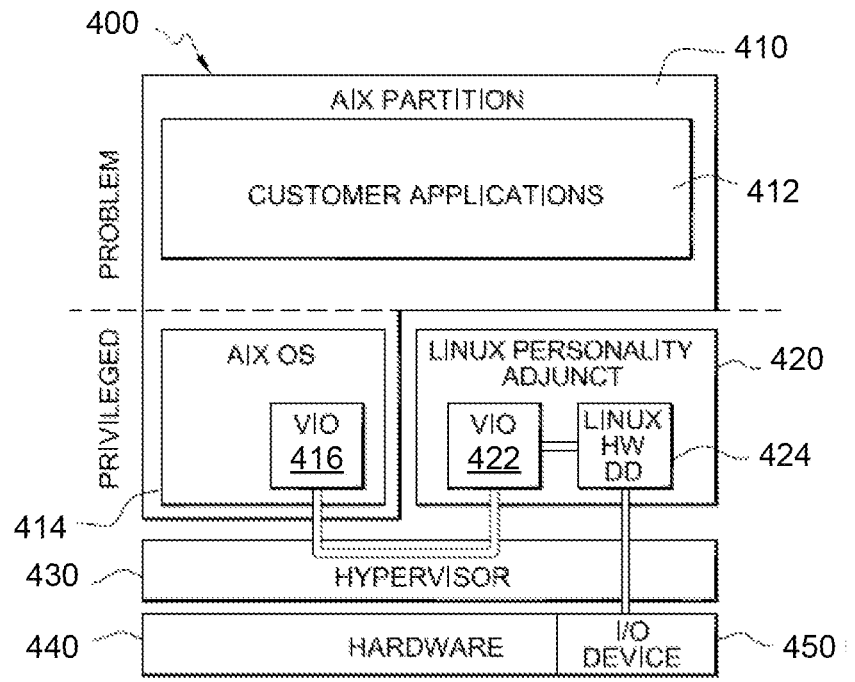
FIGS. 4A & 4B illustrate examples of an adjunct partition configuration wherein non-native operating system's device drivers are employed to access or use a physical input/output device, in accordance with an aspect of the present invention.
Figure 4B:
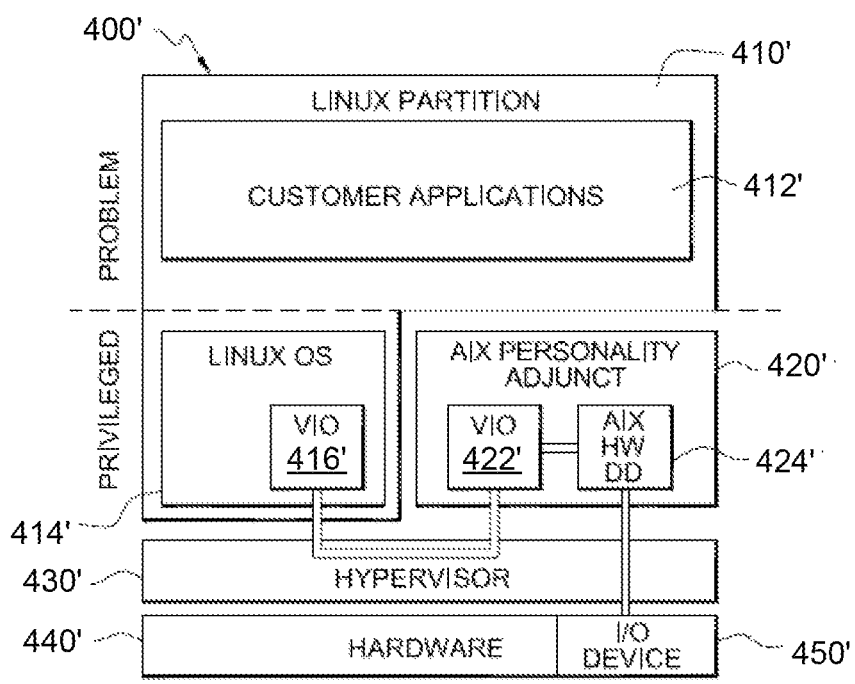

As noted above, one usage of adjunct partitions is to host device drivers, which can reduce device driver development costs by enabling device drivers to be shared between operating systems. Adjunct partitions are lightweight execution environments which operate in a separate execution state from the conventional problem and privileged states of the user applications and kernel services, respectively. This new execution state is referred to herein as the hypervisor/problem state, and is illustrated in FIGS. 4A & 4B (wherein AIX and Linux are depicted by way of example only). As explained below, instead of deploying a full VIOS partition, an operating system may instead employ an adjunct partition to support a particular, non-configurable I/O device assigned to that logical partition. In such a case, an adjunct partition is created which employs a non-native operating system's device driver as an interface to the assigned physical I/O device. Note that the native and non-native operating systems may be any two different operating systems.

FIG. 4A depicts one example of this aspect of the present invention. In this figure, a data processing system 400 is shown to comprise an AIX partition 410 and a Linux personality adjunct partition (or Linux personality adjunct) 420. AIX partition 410 is a logical partition which includes one or more customer applications 412, an AIX operating system instance 414, and a virtual I/O facility 416. AIX partition 410 runs above a hypervisor 430, and provides higher-level function than that provided by the hypervisor. Hypervisor 430 executes on top of the underlying system hardware 440, which is shown to include (one or more) I/O device 450 assigned to AIX partition 410.

Linux personality adjunct 420 is conceptually a dedicated, child partition to AIX partition 410. As described above, the adjunct partition is less than a full logical partition, but is running in a manner whereby the hypervisor enforces security and isolation between the adjunct partition and the AIX partition it runs with. The adjunct partition is provided with reduced functionality compared with a full logical partition. For example, the adjunct partition has no access to memory management unit (MMU) configuration or floating-point facilities, and is an environment wherein only the functionality needed to run the desired service (e.g., I/O driver) is provided.

In the illustrated example, the Linux personality adjunct 420 includes a virtual I/O interface 422 and a hardware device driver service 424, which allows access to I/O device 450. In this example, the hardware device driver service 424 is a Linux hardware device driver, which runs within the Linux personality adjunct 420 spawned by the AIX partition 410 in response to the AIX partition noting that it had assigned to it an I/O device 450 which was non-configurable by the AIX partition. The Linux personality adjunct 420 includes non-native kernel services sufficient to run the Linux hardware device driver for the physical I/O device. These non-native kernel services are less than a corresponding, full operating system, that is, less than a full Linux operating system in this example.

In operation, AIX partition 410 accesses I/O device 450 via the virtual I/O interface 416, 422 between the AIX operating system 414 and the Linux personality adjunct 420, which includes the Linux hardware device driver 424. By providing the non-native, Linux personality to the adjunct partition, the Linux hardware device driver is able to be run within the adjunct partition, and thereby provide access to an I/O device 450 originally assigned to AIX partition 410, notwithstanding that the I/O device is non-configurable by the AIX partition. The device becomes accessible to the AIX partition through the Linux personality adjunct 420.

FIG. 4B depicts another example of the use of an adjunct partition to provide access to a non-configurable I/O device assigned to a logical partition, which in this case is a Linux partition 410' of a data processing system 400'. The adjunct partition for this implementation is an AIX personality adjunct 420', which includes sufficient non-native, AIX kernel services within the adjunct partition to run a non-native operating system's device driver, that is, an AIX hardware device driver 424' in this example. These non-native kernel services are less than a corresponding, full operating system, that is, less than the full AIX operating system conventionally required to run the AIX hardware device driver. The Linux partition 410' is a logical partition which includes one or more customer applications 412', a Linux operating system 414', and a virtual I/O facility 416'. Linux partition 410' runs above a hypervisor 430', and provides higher-level function than that provided by the hypervisor. Hypervisor 430' executes on top of the underlying system hardware 440', which is shown to include (one or more) I/O device 450'.

AIX personality adjunct 420' is again conceptually a child partition to client partition 410'. The adjunct partition is less than a full logical partition, but is run in a manner whereby the hypervisor enforces security and isolation between the adjunct partition and the client partition it runs within, as described above. The adjunct partition is an environment wherein only the functionality needed to run the desired service (e.g., I/O driver) is provided. In this example, it is assumed that the adjunct is dedicated to the spawning logical partition, that is, Linux partition 410'.

In the illustrated example, AIX personality adjunct 420' includes a virtual I/O interface 422' and the AIX hardware device driver 424', which allows access to I/O device 450'. In operation, Linux partition 410' accesses I/O device 450' via the adjunct partition 420', as illustrated.

As used herein, a personality adjunct is an adjunct partition which has a particular operating system personality, but is less than the full operating system. In the implementation described herein, the personality adjunct is a non-native personality to the native operating system of the logical partition spawning the adjunct partition. For example, AIX partition 410 of FIG. 4A initiates creation of a Linux personality adjunct, while Linux partition 410' of FIG. 4B initiates creation of an AIX personality adjunct. These are provided by way of example only. In an alternate implementation, the personality adjunct may be a native personality to a native operating system of the logical partition spawning the adjunct partition. Further, in the non-native implementation, the personality implemented within the adjunct partition may be any non-native operating system to any native operating system of the logical partition. The personality adjunct includes a minimal service set of an operating system device driver runtime environment required by a particular device driver to run inside the adjunct. A device driver conforms to a programming environment that is defined by its host operating system environment. This programming environment typically includes a variety of kernel services for things such as memory allocation, timer services, interrupt handler registration, and invocation in response to interrupts, mapping I/O buffers for DMA (direct memory access), etc. The personality adjunct provides these services and functions in the same way that a real host operating system kernel does, such that the device driver running inside the adjunct does not know the difference between its native host operating environment and the personality adjunct described herein. This enables the unmodified device driver to be run within a lighter weight adjunct partition, in place of a full logical partition.

By way of specific example, the Linux personality adjunct 420 of FIG. 4A provides a runtime environment and kernel services which mimic the Linux device driver programming interfaces and execution environment, while the AIX personality adjunct 420' of FIG. 4B provides the runtime environment and kernel services which mimic the AIX device driver programming interfaces and execution environment of a full AIX operating system.

Multiple adjunct partitions may also be employed to provide multiple logical partitions with access to, for example, a self-virtualizing input/output device, such as a self-virtualizing input/output adapter. In a virtualized system, if a single input/output adapter is present, and that adapter is to service multiple logical partitions of the data processing system, then input/output virtualization (IOV) capabilities of the input/output device, if present, may be employed to instantiate multiple virtual functions (VF), each of which appears as an input/output adapter to a respective client logical partition. One example of a self-virtualizing input/output device is the single root input/output virtualized hardware described, for example, in "Single Root I/O Virtualization and Sharing Specification", Revision 1.0, PCI-SIG (Sep. 11, 2007), which is incorporated herein by reference in its entirety.

Adjunct partition instances may be deployed in a manner wherein each adjunct partition instance is created to support a particular logical partition to virtual function (or queue pair) pairing. Using this approach, each logical partition accesses a corresponding virtual function or queue pair employing abstract virtual input/output mechanisms. From the point of view of the client partition, this functionality is similar (or equivalent) to a VIOS implementation. However, the disadvantages of such a system are avoided since each logical partition to virtual function (or queue pair) association has a unique adjunct partition instance facilitating communication therebetween. Since each adjunct partition instance handles only a single logical partition and a single virtual function (or queue pair) it is not necessary to include locks or synchronization mechanisms otherwise needed to support multiplexing of the I/O adapter, since the system relies on the multiplexing capabilities within the self-virtualizing input/output capable device itself.

Another advantage of this adjunct partition implementation is that, since all adjunct partition instances are considered for the same device, they are able to share code and read only data, which substantially reduces the memory foot-print required to support the implementation, with the memory foot-print cost of adding an adjunct partition instance being simply the cost associated with maintaining dynamic state information for the logical partition to virtual function (or queue pair) pairing for the new adjunct partition instance.

Further, adjunct partition instances, since they are configured to support only one logical partition to virtual function (or queue pair) pairing at a time, may be readily written in a manner to avoid many of the synchronization and locking mechanisms required by traditional I/O stacks and drivers, both in native device drivers and VIOS-based implementations. For example, adjunct partitions may be written as polling state machines, and the dedicated nature of their runtime environment precludes the need to support active preemption, thus simplifying or eliminating the need for locking.

To summarize, the use of adjunct partitions in the manner described herein permits logical partitions to obtain I/O services from input/output virtualization-capable, input/output devices or adapters in a manner that minimizes the device-driver development required for each operating system of the logical partition, since the operating systems only see virtual input/output (VIO) services (e.g., device driver services), not specific physical input/output adapter devices. This avoids the need to instantiate a logical partition to multiplex the underlying I/O hardware, and permits the multiplexing of I/O hardware to be accomplished via efficient VIO hardware capabilities, rather than software locks in a VIOS. This last aspect is a property that arises from the unique programming model of an adjunct partition, and assumes that a particular adjunct partition implementation used to support a particular I/O device makes use of these properties to create an efficient implementation.

Figure 5:
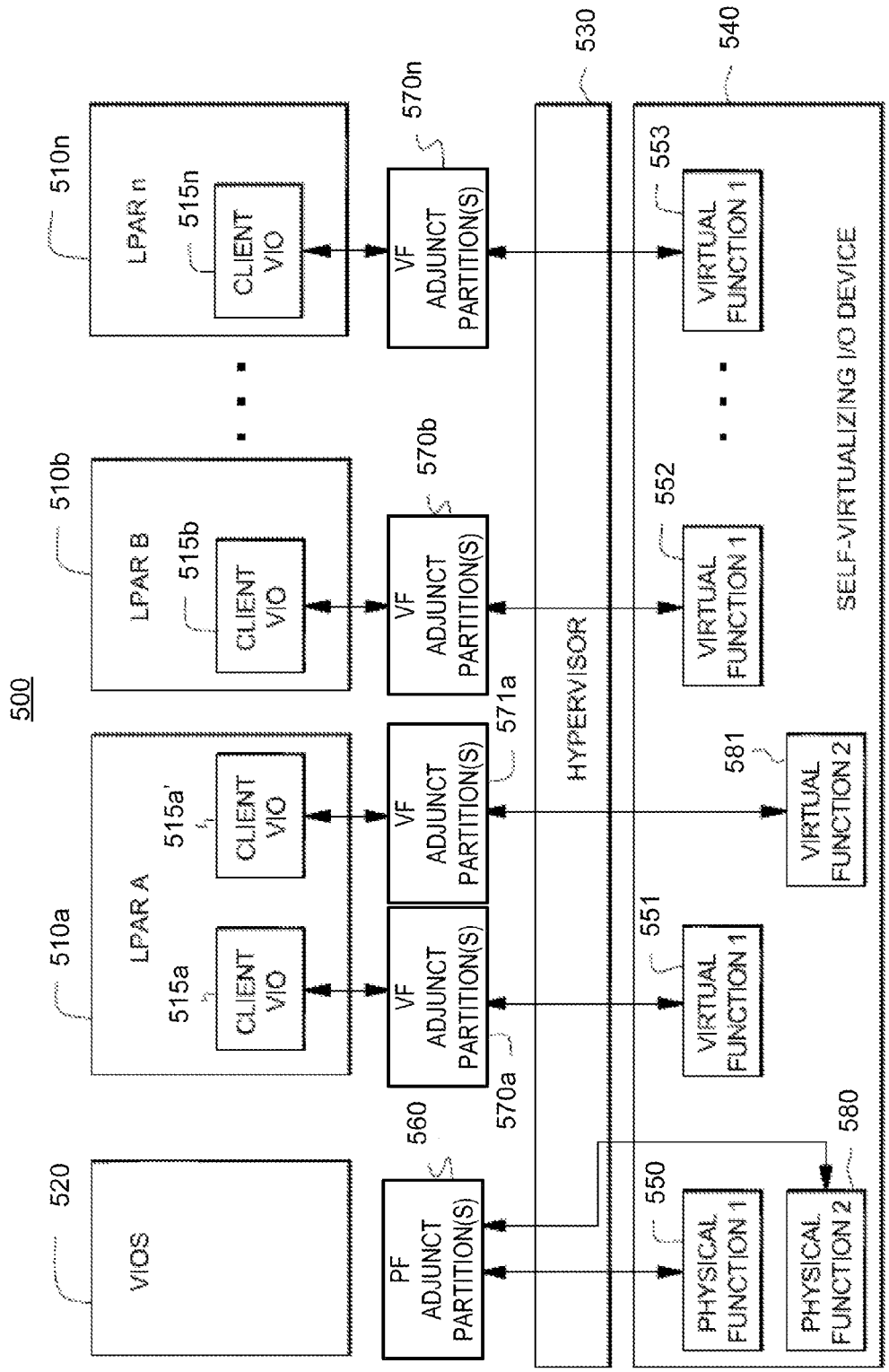
FIG. 5 illustrates one embodiment of a data processing system wherein multiple logical partitions are interfaced via device drivers within the multiple logical partitions to multiple virtual function instances of a self-virtualizing IO resource.

FIG. 5 depicts one embodiment of a data processing system, generally denoted 500, in accordance with an aspect of the present invention. Within data processing system 500, multiple logical partitions 510a, 510b . . . 510n, and a VIOS 520 run above a hypervisor 530, and provide higher-level function than that provided by the hypervisor. Hypervisor 530 executes on top of underlying system hardware, including a self-virtualizing input/output device (or adapter) 540. VIOS 520 is optional within the data processing system embodiment depicted. The self-virtualizing input/output device 540 is, in one embodiment, an input/output virtualization capable I/O adapter. This adapter may present multiple virtual function instances 551, 552, 553 from a first physical function 550, each of which presents the functionality associated with a normal I/O adapter. Further, in this embodiment, a second physical function 580 is depicted, from which a second virtual function 581 is provided, by way of example.

Each virtual function is assigned to provide I/O services to a particular logical partition in the data processing system. The logical partitions in question avoid having direct interactions with their virtual functions, so as to maintain hardware abstraction, by employing adjunct partition instances instantiated for each logical partition to virtual function pairing. These adjunct partitions 570a, 571a, 570b, 570n are referred to as virtual function (VF) adjunct partitions due to the dedicated nature of the adjunct partitions to a particular logical partition to virtual function pairing. For all virtual functions associated with a same underlying hardware device, i.e., physical function 550 or physical function 580, the adjunct partition instances instantiated are the same. That is, each adjunct partition instance 570a, 570b . . . 570n is the same, while adjunct partition instantiation 571a is assumed to be different since it interfaces to a different virtual function 581, associated with a different physical function 580. Advantageously, by interjecting adjunct partitions between the logical partitions and the virtual functions, the input/output within each logical partition can be virtualized as a client virtual input/output (VIO) 515a, 515a', 515b . . . 515n.

By way of specific example, the underlying physical function might comprise a peripheral component interconnect (PCI) function that supports the single root I/O virtualization capabilities (SR-IOV) defined in the above-referenced "Single Root I/O Virtualization and Sharing Specification".

The physical function would thus contain the SR-IOV capability structure. A virtual function is associated with the physical function, and shares one or more physical resources, such as a link, with the physical function and with other virtual functions that are associated with the same virtual function. A "function" means, in one embodiment, an addressable entity in configuration space associated with a single function number. A function may refer to one function in a multi-function device, or to the only function in a single-function device.

A physical function adjunct partition 560 is employed during initial configuration of the data processing system to facilitate setup of the virtual function adjunct partitions. Note that in the data processing system embodiment depicted in FIG. 5, multiple physical functions and multiple different virtual function instances are illustrated, two of which are accessed by a single logical partition via different virtual function adjunct partitions 570a, 571a. One, two or more than two physical functions may be implemented within the self-virtualizing input/output device, and each logical partition may access one or more of these physical functions via an associated virtual function of the device. Also, note that the client virtualized interfaces or drivers (client VIO 515a, client VIO 515a') within LPAR A 510a may be the same or different types of virtual interfaces or drivers, depending on the adjunct partition instances implemented for the particular logical partition to virtual function pairing.

The virtual function adjunct partitions 570a, 571a, 570b, 570n implement, in one embodiment, a server virtual adapter device driver, which interfaces with the respective client VIO within the associated logical partition, as well as a device driver for the virtual function on the self-virtualizing input/output device adapter. Each adjunct partition drives the respective virtual function on the adapter similar to the server virtual adapter device driver within a VIOS implementation. Creation of the adjunct partitions may be initiated by the respective logical partition, or by the hypervisor within the data processing system. Further, the advantages and characteristics of the respective adjunct partitions would be the same as described above. By way of example, each adjunct partition may implement a non-native operating system's device driver from the native operating system of the associated logical partition.

Those skilled in the art will note from the above discussion that the programming model described herein allows adjunct partition code developers to write code in a manner that allows typical operating system-kernel-code locking and synchronization primitives to be simplified or avoided. Adjunct partitions may be efficiently written as single-threaded polling state machines, and by controlling the degree of concurrency visible to a particular adjunct partition instance, it is possible to ensure that adjunct partition code may assume a runtime environment that is non-preemptive and single-threaded. For input/output processing work, there is little need for multiple threads to simultaneously execute to service a particular logical partition to virtual function pairing. These properties are feasible because each adjunct partition instance services a single logical partition to virtual function pairing in an isolated/protected environment (that is, a separate dispatchable state protected as described above), and adjunct partition instances can be deployed with overhead low enough to permit a single adjunct instance per logical partition to virtual function pairing, unlike a VIOS implementation.

Similarly, a data processing system similar to data processing system 500 may be utilized in connection with a self-virtualizing input/output device that utilizes a basic function and a queue structure virtualizable into multiple queue pairs. Each queue pair may be associated with the function, and may share one or more physical resources, such as a link, with the function and with other queue pairs that are associated with the same function. Multiple adjunct partitions may be employed to interface, for example, multiple logical partitions to respective queue pairs within the self-virtualizing input/output device, with a function adjunct partition employed during initial configuration of the data processing system to facilitate initial setup of the adjunct partitions. By providing an adjunct partition as an interface between each logical partition to queue pair pairing, a virtual input/output interface or driver can be employed within the respective logical partition. In this case, the logical partition is unaware of the actual type of hardware employed. The adjunct partition may include, for example, a server virtual device driver interfaced to a respective client VIO of the associated logical partition, as well as an appropriate physical adapter device driver for interfacing to the respective queue pair within the self-virtualizing input/output device.

Additional details regarding adjunct partitions are described in the aforementioned cross-referenced applications. In addition, various modifications to the adjunct partitions described herein will be appreciated by one of ordinary skill in the art having the benefit of the instant disclosure. Therefore, the invention is not limited to the particular adjunct partition implementations discussed herein.

Priority Collision Avoidance in Self-Virtualizing IO Resource

Embodiments consistent with the invention utilize frame wrapping to enforce QoS prioritization with a converged or multi-function self-virtualizing IO resource such as a converged SRIOV adapter. In particular, frame wrapping is used to avoid conflicting priorities from frames associated with virtual functions for which ACLs are not enforced, and thereby preserve QoS prioritization for lossless traffic classes.

Converged Enhanced Ethernet (which may be referred to as "CE" or "CEE") allows for running multiple traffic classes, e.g., Fibre Channel, IPC, management and LAN traffic, over a single adapter/single Ethernet fabric, which can bring tremendous cost benefits to data centers via fabric convergence. Each traffic class has shared or non-shared priority characteristics that are negotiated via DCBX exchange between the adapter and the switch.

The DCBX exchange protocol allows for the negotiation of traffic priorities, which normally classifies Fibre Channel as lossless traffic and LAN as lossy traffic. The priorities are used to establish the membership to a priority class. The priority field in the VLAN header of the Ethernet frame is used by the adapter to execute QoS prioritization. Table I, for example, illustrates an exemplary set of priorities that may be used for QoS prioritization via DCBX exchange:

TABLE I

Priority Classes Established Via DCBX Exchange Ethernet Port Context

| PG ID | Priority | Strict | Use | PFC | Bandwidth Allocation |
|---|---|---|---|---|---|
| 0 | 1 | False | SAN | Lossless | 60% |
|   | 3 | False | SAN | Lossless |   |
| 1 | 2 | False | LAN | Lossy | 40% |

TABLE I-continued

Priority Classes Established Via DCBX Exchange Ethernet Port Context

| PG ID | Priority | Strict | Use | PFC | Bandwidth Allocation |
|---|---|---|---|---|---|
| 2-7 | NC | NC | NC | NC | NC |
| 8-14 |   |   | Reserved |   |   |
| 15 | 0 | True | Mgt | Lossy |   |

Adapters using both Fibre Channel and LAN over the same physical port are referred to as converged adapters. With a non-self-virtualizing converged adapter, the drivers in an operating system that uses the adapter can typically view both the Fibre Channel and LAN functions to resolve any conflicts. Thus, there are typically no concerns that a LAN driver will allow for the placement of Ethernet frames on the fabric with priorities that conflict with the pre-negotiated priorities established for QoS prioritization. The Ethernet interface exposed to the operating system allows an administrator to create VLANs and any priority within the VLAN device, and a risk exists that these priorities may conflict with Fibre Channel and other traffic for which QoS prioritization is used. However, since the LAN driver can query the Fibre Channel priorities and inspect egress LAN frames for invalid priorities, on detection of an invalid priority, a frame may simply be dropped and an appropriate statistic incremented. On the other hand, there is a performance overhead incurred in having the operating system driver perform the frame parsing and discard in software.

With a self-virtualizing converged adapter such as an SRIOV adapter, however, operating systems and their respective drivers are typically not aware of all of the other traffic classes that are being communicated over the adapter. An SRIOV adapter presents virtual functions to each operating system, and from the perspective of the operating systems, are treated the same as standalone adapters. Therefore, an operating system and device driver for a LAN virtual function, which may be resident in a logical partition, will typically not be aware of other logical partitions running with other virtual functions with potentially conflicting traffic classes, so a greater risk exists that LAN frames may be issued by a LAN device driver with conflicting priorities.

In some instances, this risk may be mitigated through the use of Access Control Lists (ACLs), which restrict the usable virtual function priorities. If a logical partition or a driver therein attempts to transmit a frame for a virtual function with a priority that conflicts with a lossless priority assigned to the virtual function, then the frame may be dropped by the adapter on egress ACL checking. For example, Table II below illustrates an exemplary ACL list for an SRIOV adapter:

TABLE II

Priorities Specified For a Virtual Function Under ACLs

Virtual Port Context

.
.
.
MAC1 Associated with VF
MAC2 Associated with VF
MAC3 Associated with VF
MAC4 Associated with VF
VLAN ID1 Associated with VF
.
.
.

TABLE II-continued

Priorities Specified For a Virtual Function Under ACLs

VLAN ID20 Associated with VF
Ethertype 1
.
.
.
Ethertype 4
DMAC (FC)
802.1p Priorities
.
.
.

However, it may be the case in some instances that a virtual function may not enforce ACLs. A non-ACL virtual function then can become a security exposure because it can place frames with conflicting priorities on the fabric. Since there is no method to enforce the priority, the Fibre Channel and other lossless traffic may be adversely impacted.

Embodiments consistent with the invention, on the other hand, address this problem by requiring a multi-function self-virtualizing IO resource such as a converged SRIOV adapter to perform frame wrapping in certain instances to protect and preserve Fibre Channel and other lossless traffic QoS from impacts originating from a non-ACL virtual function.

In one embodiment consistent with the invention, for example, a converged SRIOV adapter may be required to perform either of the following actions upon receipt of a frame with a conflicting (or invalid) priority:

1. Detect and drop the frame and increment a virtual function invalid or conflicting priority error statistic; or
2. Wrap the frame using Q-in-Q frame wrapping in the virtual Ethernet bridging (VEB) component of the adapter.

This functionality, for example, may be enforced in an adapter to preserve expected QoS capabilities while allowing for maximum flexibility. As an additional benefit, by offloading the frame checking from software to adapter hardware, the software overhead may be effectively eliminated.

Q-in-Q frame wrapping, which is defined under 802.1QinQ and VLAN/PVID—802.1AB, wraps a frame with an additional VLAN tag (e.g., as defined by 802.1Q). The VLAN tag incorporates a 3 bit priority field, and as such, a wrapping frame may include a VLAN tag with a valid and non-conflicting priority value with respect to the priorities used in QoS prioritization. At the endpoint, this additional VLAN tag may be stripped off the frame so that an original priority specified in an original VLAN tag for the frame can be used at the endpoint. An agreed-upon priority value may be used for the Q-in-Q frame to ensure no conflict with the priorities of lossless traffic classes. It will be appreciated that in other embodiments, frame wrapping other than Q-in-Q frame wrapping may be used, and other formats of tags may be used to wrap a frame. Therefore, the invention is not limited to the particular implementations discussed herein.

Figure 6:
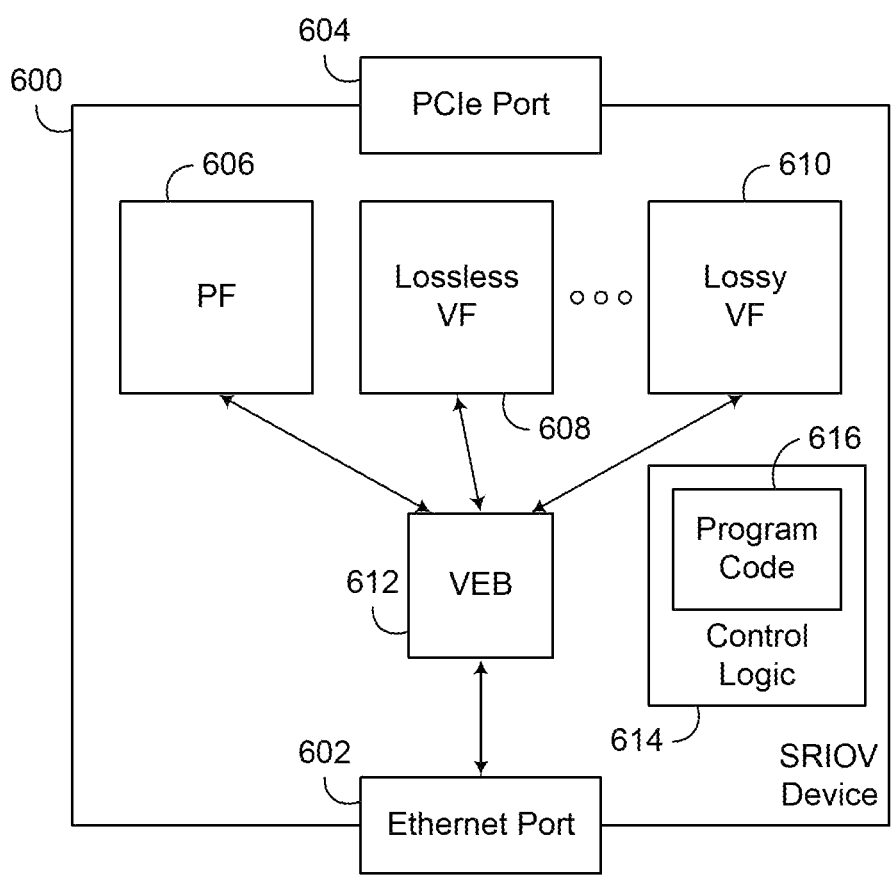
FIG. 6 illustrates a self-virtualizing IO resource utilizing priority collision avoidance consistent with the invention, and capable of being utilized in the data processing system of FIG. 5.

FIG. 6 illustrates an exemplary converged SRIOV adapter 600 including an Ethernet port 602 for coupling to a network fabric, and a PCIe port 604 for interfacing with a logically-partitioned data processing system. The adapter includes at least one physical function 606 and a plurality of virtual functions, including a lossless virtual function 608 for communicating a lossless traffic class such as Fibre Channel, and a lossy virtual function 610 for communicating a lossy traffic class such as LAN traffic. A virtual Ethernet bridge 612 is implemented in adapter 600 to bridge data traffic from multiple traffic classes, and control logic 614 implemented in the adapter hardware handles QoS prioritization in the manner discussed herein, e.g., by executing firmware instructions such as found in program code 616.

In order to preserve lossless QoS, adapter 600 performs checking on egress frames, and consistent with the invention, is configured to address the case where ACLs are not enabled for a virtual function. The logic that may be implemented in adapter 600 to implement such egress checking is set forth in the pseudocode in Table III below:

TABLE III

Frame Egress Checking Pseudocode

If ((FALSE == VF_ACL) && (TRUE == Frame_Priority_conflict( ))) {
   if (TRUE == Q-in-Q_configured) {
      //Wrap Frame in Q-in-Q and proceed with transmit
   } else {
      //invalid frame
      drop_frame( );
      stats.invalid_priority_error++;
   }
}

Figure 7:
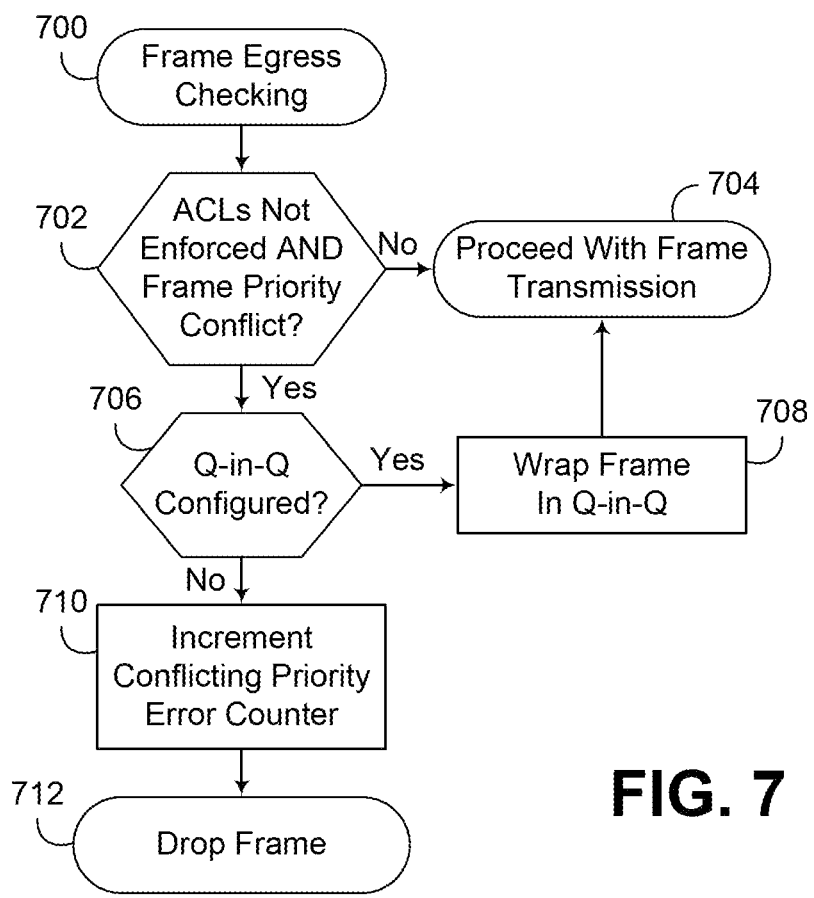
FIG. 7 illustrates an exemplary sequence of operations for a frame egress checking routine capable of being performed by the self-virtualizing IO resource of FIG. 6.

FIG. 7 illustrates a frame egress checking routine 700 executed by adapter 600 and corresponding to the pseudocode of Table III. Routine 700 begins in block 702 by determining whether ACLs are not being enforced for a virtual function and a frame priority conflict exists. If both conditions are not met, control passes to block 704 to proceed with frame transmission. If, however, both conditions are met, block 702 passes control to block 706 to determine whether Q-in-Q is configured. If so, control passes to block 708 to wrap the frame in Q-in-Q, thereby wrapping the frame with a VLAN tag having a valid priority. Control then passes to block 704 to proceed with frame transmission.

If Q-in-Q is not configured, however, block 706 passes control to block 710 to increment a conflicting priority error counter or other statistic for the virtual function, thereby logging the error. The error may be detected and managed through a management interface for the logically-partitioned computer, e.g., a hardware management console (HMC). Control then passes to block 712 to drop the frame, and thereby terminate transmission.

Thus, in contrast to prior solutions using ACLs, the herein-described embodiments are less restrictive, particularly for cases where maximum operating system administrator flexibility in required at the virtual function level. For these non-ACL cases, a wrapping of the traffic in violation into a Q-in-Q class typically allows operating system administrators to use desired properties with no impact to Fibre Channel and other lossless virtual functions.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:
1. A method of preserving traffic class priority Quality of Service (QoS) in a converged single root input/output virtualization (SRIOV) network adapter, the method comprising, in the converged SRIOV network adapter:
   communicating data associated with first and second virtual functions, the first and second virtual functions respectively associated with first and second traffic classes, wherein the first traffic class is a lossless traffic class that supports QoS prioritization and the second traffic class is a lossy traffic class;

detecting a conflicting priority for a frame associated with the second virtual function prior to transmission of the frame over a network to which the converged SRIOV network adapter is coupled;

determining whether the second virtual function enforces Access Control Lists (ACLs);

determining whether Q-in-Q wrapping is configured in the converged SRIOV network adapter;

if the second virtual function is determined to not enforce ACLs and Q-in-Q wrapping is determined to be configured in the converged SRIOV network adapter, Q-in-Q wrapping the frame with a Q-in-Q VLAN tag that includes a valid priority prior to transmitting the frame over the network; and if the second virtual function is determined to not enforce ACLs and Q-in-Q wrapping is determined to not be configured in the converged SRIOV network adapter, dropping the frame and incrementing a conflicting priority error statistic for the second virtual function.

2. A method of preserving traffic class priority Quality of Service (QoS) in a multi-function self-virtualizing input/output (IO) resource, the method comprising, in the multi-function self-virtualizing IO resource:

communicating data associated with first and second virtual functions, the first and second virtual functions respectively associated with first and second traffic classes, wherein the first traffic class supports QoS prioritization;

detecting a conflicting priority for a frame associated with the second virtual function prior to transmission of the frame over a network to which the multi-function self-virtualizing IO resource is coupled; and in response to detecting the conflicting priority, wrapping the frame with an additional tag having a non-conflicting priority prior to transmitting the frame over the network.

3. The method of claim 2, further comprising determining whether frame wrapping is configured in the multi-function self-virtualizing IO resource, wherein wrapping the frame is performed only if frame wrapping is configured in the multi-function self-virtualizing IO resource.

4. The method of claim 3, further comprising dropping the frame if frame wrapping is not configured in the multi-function self-virtualizing IO resource.

5. The method of claim 4, further comprising incrementing a conflicting priority error statistic for the second virtual function if frame wrapping is not configured in the multi-function self-virtualizing IO resource.

6. The method of claim 3, wherein wrapping the frame comprises Q-in-Q wrapping the frame with a Q-in-Q VLAN tag.

7. The method of claim 6, wherein the frame includes a second VLAN tag that includes the conflicting priority, wherein the Q-in-Q VLAN tag includes a valid priority, and wherein an endpoint that receives the wrapped frame is configured to strip the Q-in-Q VLAN tag from the frame and use the priority in the second VLAN tag.

8. The method of claim 2, further comprising determining whether the second virtual function does not enforce Access Control Lists (ACLs), wherein wrapping the frame is performed only if the virtual function that originated the frame has no ACLs enforced.

9. The method of claim 8, further comprising dropping the frame if the second virtual function does enforce ACLs.

10. The method of claim 2, wherein the first virtual function is associated with a lossless traffic class and the second virtual function is associated with a lossy traffic class.

11. The method of claim 10, wherein the first virtual function is associated with Fibre Channel traffic and the second virtual function is associated with Ethernet traffic.

12. The method of claim 2, wherein the multi-function self-virtualizing IO resource comprises a converged SRIOV network adapter.

13. An apparatus, comprising:

a multi-function self-virtualizing input/output (IO) resource; and control logic resident in the multi-function self-virtualizing IO resource and configured to preserve traffic class priority Quality of Service (QoS) in the multi-function self-virtualizing IO resource by:

communicating data associated with first and second virtual functions, the first and second virtual functions respectively associated with first and second traffic classes, wherein the first traffic class supports QoS prioritization;

detecting a conflicting priority for a frame associated with the second virtual function prior to transmission of the frame over a network to which the multi-function self-virtualizing IO resource is coupled; and in response to detecting the conflicting priority, wrapping the frame with an additional tag having a non-conflicting priority prior to transmitting the frame over the network.

14. The apparatus of claim 13, wherein the control logic is further configured to determine whether frame wrapping is configured in the multi-function self-virtualizing IO resource, and wherein the control logic is configured to wrap the frame only if frame wrapping is configured in the multi-function self-virtualizing IO resource.

15. The apparatus of claim 14, wherein the control logic is further configured to drop the frame if frame wrapping is not configured in the multi-function self-virtualizing IO resource.

16. The apparatus of claim 15, wherein the control logic is further configured to increment a conflicting priority error statistic for the second virtual function if frame wrapping is not configured in the multi-function self-virtualizing IO resource.

17. The apparatus of claim 14, wherein the control logic is configured to wrap the frame by Q-in-Q wrapping the frame with a Q-in-Q VLAN tag.

18. The apparatus of claim 17, wherein the frame includes a second VLAN tag that includes the conflicting priority, wherein the Q-in-Q VLAN tag includes a valid priority, and wherein an endpoint that receives the wrapped frame is configured to strip the Q-in-Q VLAN tag from the frame and use the priority in the second VLAN tag.

19. The apparatus of claim 13, wherein the control logic is further configured to determine whether the second virtual function does not enforce Access Control Lists (ACLs), wherein the control logic is configured to wrap the frame only if the virtual function that originated the frame has no ACLs enforced.

20. The apparatus of claim 19, wherein the control logic is further configured to drop the frame if the second virtual function does enforce ACLs.

21. The apparatus of claim 13, wherein the first virtual function is associated with a lossless traffic class and the second virtual function is associated with a lossy traffic class.

22. The apparatus of claim 21, wherein the first virtual function is associated with Fibre Channel traffic and the second virtual function is associated with Ethernet traffic.

23. The apparatus of claim 13, wherein the multi-function self-virtualizing IO resource comprises a converged SRIOV network adapter.

24. A program product, comprising:

a non-transitory computer readable medium; and program code stored on the computer readable medium and configured upon execution to preserve traffic class priority Quality of Service (QoS) in the multi-function self-virtualizing IO resource by:

communicating data associated with first and second virtual functions, the first and second virtual functions respectively associated with first and second traffic classes, wherein the first traffic class supports QoS prioritization;

detecting a conflicting priority for a frame associated with the second virtual function prior to transmission of the frame over a network to which the multi-function self-virtualizing IO resource is coupled; and in response to detecting the conflicting priority, wrapping the frame with an additional tag having a non-conflicting priority prior to transmitting the frame over the network.

* * * * *